(12) United States Patent
Kim et al.

(10) Patent No.: US 8,879,924 B2
(45) Date of Patent: Nov. 4, 2014

(54) VISIBLE LIGHT COMMUNICATION METHOD USING DMX-512 NETWORK AND APPARATUSES FOR THE SAME

(71) Applicant: Electronics and Telecommunications Research Institute, Daejeon (KR)

(72) Inventors: In-Su Kim, Daejeon (KR); Tae-Gyu Kang, Daejeon (KR); Sang-Kyu Lim, Daejeon (KR); Dae-Ho Kim, Daejeon (KR); You-Jin Kim, Daejeon (KR); Seong-Hee Park, Daejeon (KR); Il-Soon Jang, Daejeon (KR); Hyun-Seok Kim, Daejeon (KR); Hyun-Jong Kim, Chungbuk (KR); Jin-Doo Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/748,772

(22) Filed: Jan. 24, 2013

(65) Prior Publication Data

US 2013/0188968 A1    Jul. 25, 2013

(30) Foreign Application Priority Data

Jan. 25, 2012  (KR) .................. 10-2012-0007252
Dec. 27, 2012  (KR) .................. 10-2012-0154224

(51) Int. Cl.
*H04B 10/00* (2013.01)
*H04B 10/50* (2013.01)
*H04B 10/60* (2013.01)
*H04B 10/116* (2013.01)

(52) U.S. Cl.
CPC ............. *H04B 10/50* (2013.01); *H04B 10/60* (2013.01); *H04B 10/116* (2013.01)
USPC ........... 398/172; 398/182; 398/118; 398/128; 398/130; 315/291; 315/307; 315/312

(58) Field of Classification Search
USPC ......... 398/172, 182, 202, 118, 119, 127, 124, 398/128, 130, 183, 135, 136; 315/291, 307, 315/312, 292, 294, 316, 247
See application file for complete search history.

(56) References Cited

U.S. PATENT DOCUMENTS 7,180,252 B2 *  2/2007  Lys et al. ............... 315/312
8,634,725 B2 *  1/2014  Jang et al. ............. 398/172

FOREIGN PATENT DOCUMENTS

KR    1020110061069 A    6/2011

* cited by examiner

*Primary Examiner* — Hanh Phan
(74) *Attorney, Agent, or Firm* — Ladas & Parry LLP

(57) ABSTRACT

Disclosed herein are a Visual Light Communication (VLC) method and apparatus using a DMX-512 network. The VLC apparatus includes a DMX signal generation unit and a DMX signal transmission unit. The DMX signal generation unit generates VLC data packets each including a DMX header, fragmentation information, and a data fragment. The DMX signal transmission unit transmits the VLC data packets to an LED lighting apparatus coupled over a DMX-512 network in order to perform VLC.

20 Claims, 7 Drawing Sheets

VISIBLE LIGHT COMMUNICATION METHOD USING DMX-512 NETWORK AND APPARATUSES FOR THE SAME

CROSS-REFERENCE TO RELATED APPLICATION

This application claims the benefit of Korean Patent Application Nos. 10-2012-0007252 and 10-2012-0154224, filed on Jan. 25, 2012 and Dec. 27, 2012, respectively, which are hereby incorporated by reference in their entirety into this application.

BACKGROUND OF THE INVENTION

1. Technical Field

The present invention relates generally to Visible Light Communication (VLC) technology and, more particularly, to technology that transmits VLC data, to be transmitted through VLC using a light source such as a Light-Emitting Diode (LED), to the light source over a DMX-512 network.

2. Description of the Related Art

As the use of lighting apparatuses using Light-Emitting Devices (LEDs), that is, semiconductor devices capable of transferring information using visible rays, increases, service for transferring information using lighting apparatus is attracting interest. A VLC system using LED lighting requires a lighting control network that is capable of carrying VLC data from a data provider to a lighting apparatus.

DMX-512 that is used as lighting control network technology is currently used for the purpose of transferring dimming data. Basically, the DMX-512 technology can send dimming information via 512 channels at 1 byte per channel. If VLC data is assigned to DMX-512 channels using the above characteristic of DMX-512, DMX-512 can be used to transmit not only dimming data, but also communication data to be used in VLC.

In the conventional technology, communication data of 1 byte is assigned to each of the DMX-512 channels, and communication data of a maximum of 512 bytes defined in the DMX-512 standard is transferred via the DMX-512 channels. However, there is a problem in that the variety of requirements of VLC cannot be satisfied by the conventional technology having the limit of 512 bytes, because, depending on the use environment and purpose of VLC, data of 512 bytes or more frequently needs to be transmitted.

As an example of the conventional technology, Korean Patent Application Publication No. 2011-0061069 discloses an LED lighting apparatus that performs control so that DMX-512 data can be transmitted in accordance with the DMX-512 protocol.

SUMMARY OF THE INVENTION

Accordingly, the present invention has been made keeping in mind the above problems occurring in the conventional art, and an object of the present invention is to effectively transfer VLC data, to be transmitted through VLC, to a light source over a DMX-512 lighting control network.

Another object of the present invention is to transmit VLC data to LED lighting apparatuses coupled over a DMX-512 lighting control network even when VLC data to be transmitted through VLC exceeds 512 bytes.

Yet another object of the present invention is to appropriately fragment VLC data in order to transmit the VLC data over a DMX-512 lighting control network, and to insert appropriate fragmentation information to the fragmented VLC data so that a receiving side can restore the fragmented VLC data precisely and effectively.

In order to accomplish one or more of the above objects, the present invention provides a VLC method, including generating VLC data packets each comprising a DMX header, fragmentation information, and a data fragment; and transmitting the VLC data packets to an LED lighting apparatus coupled over a DMX-512 network in order to perform VLC.

The data fragment may be generated by fragmenting a VLC frame to be transmitted; and the fragmentation information may be used by a receiver to generate the VLC frame by recombining data fragments corresponding to the VLC data packets.

Other data may not be transmitted until all the data fragments that are generated by fragmenting the VLC frame are transmitted.

The fragmentation information may include remainder information indicative of the number of data fragments that belong to the data fragments, corresponding to the VLC frame and remain after the data fragment.

The remainder information may be set to a number that is obtained by subtracting 1 from a number of all data fragments in relation to a first data fragment of the data fragments, and may be set in the manner of sequentially decreasing up to 0 in relation to the remaining data fragments.

The fragmentation information may include a start flag that is set only for a first one of the data fragments.

The fragmentation information may include number information that corresponds to the serial numbers of the data fragments.

The DMX header may include Break&Mark After Break (Break&MAB) information and a start code; and the start code may be set to a value that is different from a value used in a packet intended for lighting control.

In order to accomplish one or more of the above objects, the present invention provides a VLC apparatus, including a DMX signal generation unit configured to generate VLC data packets each comprising a DMX header, fragmentation information, and a data fragment; and a DMX signal transmission unit configured to transmit the VLC data packets to an LED lighting apparatus coupled over a DMX-512 network in order to perform VLC.

The data fragment may be generated by fragmenting a VLC frame to be transmitted; and the fragmentation information may be used by a receiver to generate the VLC frame by recombining data fragments corresponding to the VLC data packets.

The VLC apparatus may not transmit other data until all the data fragments generated by fragmenting the VLC frame are transmitted.

In order to accomplish one or more of the above objects, the present invention provides a DMX-VLC lighting apparatus, including a DMX signal reception unit configured to receive VLC data packets each comprising a DMX header, fragmentation information, and a data fragment; and a VLC data processing unit configured to generate a VLC frame by recombining data fragments corresponding to the VLC data packets using the fragmentation information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
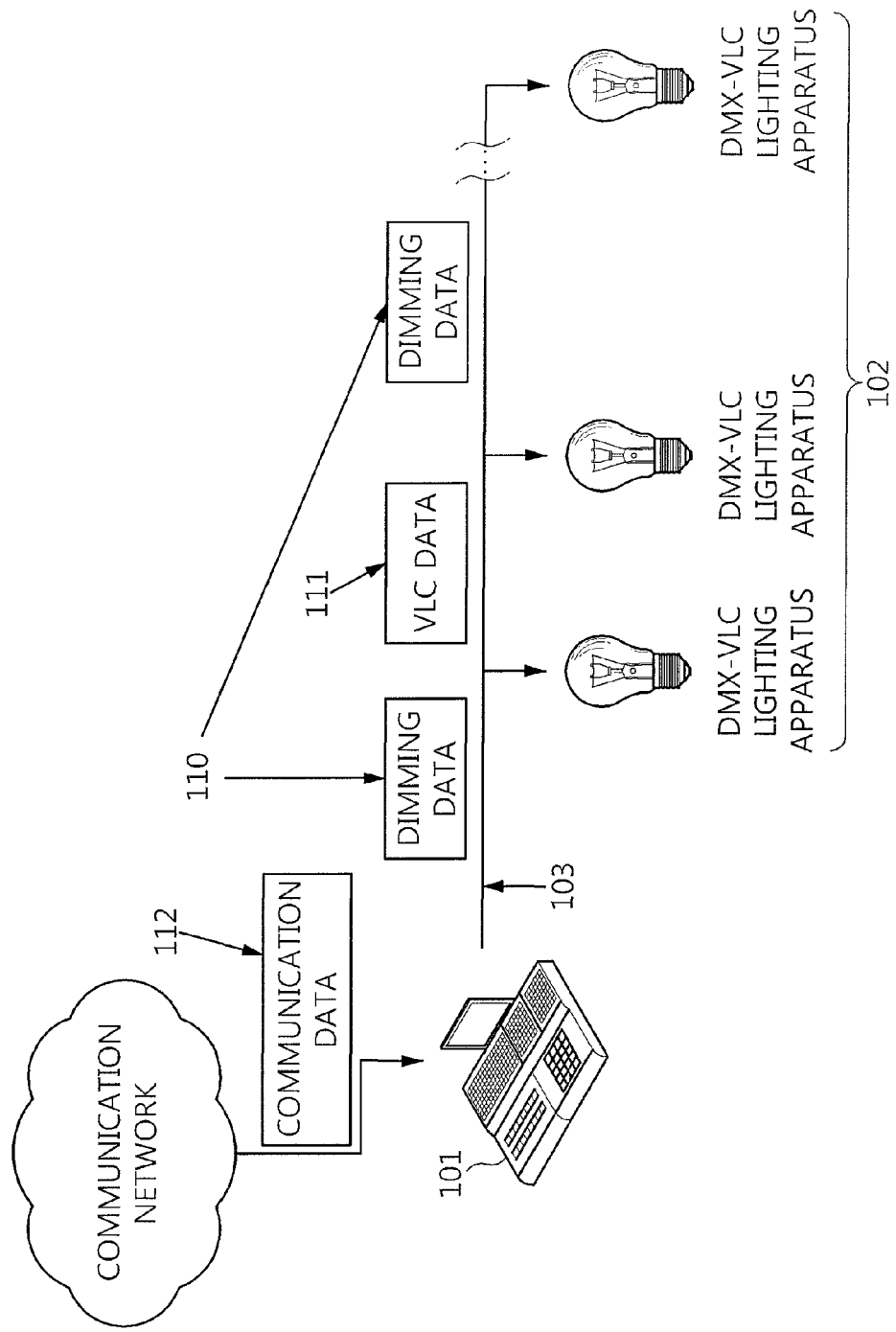
FIG. 1 is a diagram illustrating a system to which a VLC method using a DMX-512 network is applied according to an embodiment of the present invention.

The present invention will be described in detail below with reference to the accompanying drawings. Repeated descriptions and descriptions of known functions and constructions which have been deemed to make the gist of the present invention unnecessarily vague will be omitted below. The embodiments of the present invention are provided in order to fully describe the present invention to a person having ordinary knowledge in the art. Accordingly, the shapes, sizes, etc. of elements in the drawings may be exaggerated to make the description clear.

Exemplary embodiments of the present invention will be described in detail below with reference to the accompanying drawings.

FIG. 1 is a diagram illustrating a system to which a VLC method using a DMX-512 network is applied according to an embodiment of the present invention.

Referring to FIG. 1, a VLC system using a DMX-512 network includes a lighting control apparatus 101 and one or more DMX-VLC lighting apparatuses 102.

The lighting control apparatus 101 is connected to a data communication network, such as the Internet, and can transmit and receive communication data (i.e., a VLC frame) 112 to be used in VLC.

The DMX-VLC lighting apparatus 102 has the functions of receiving data from the lighting control apparatus 101 using DMX-512 communication technology and, if necessary, transmitting information via a visible ray using a VLC function. The lighting control apparatus 101 and the DMX-VLC lighting apparatuses 102 are coupled by a DMX line 103. Both dimming data 110 for common lighting control and VLC data 111 for VLC can be transmitted through the DMX line 103. Here, both the dimming data 110 and the VLC data 111 may be in a packet form. The lighting control apparatus 101 extends a transmission interval for the transmission of the dimming data within the limits of a DMX-512 standard, and transmits the VLC data between pieces of dimming data at the extended transmission interval. The VLC data 111 may be generated based on the communication data 112. Here, the VLC data and the communication data have the same values, but may be based on different transmission protocols.

Figure 2:
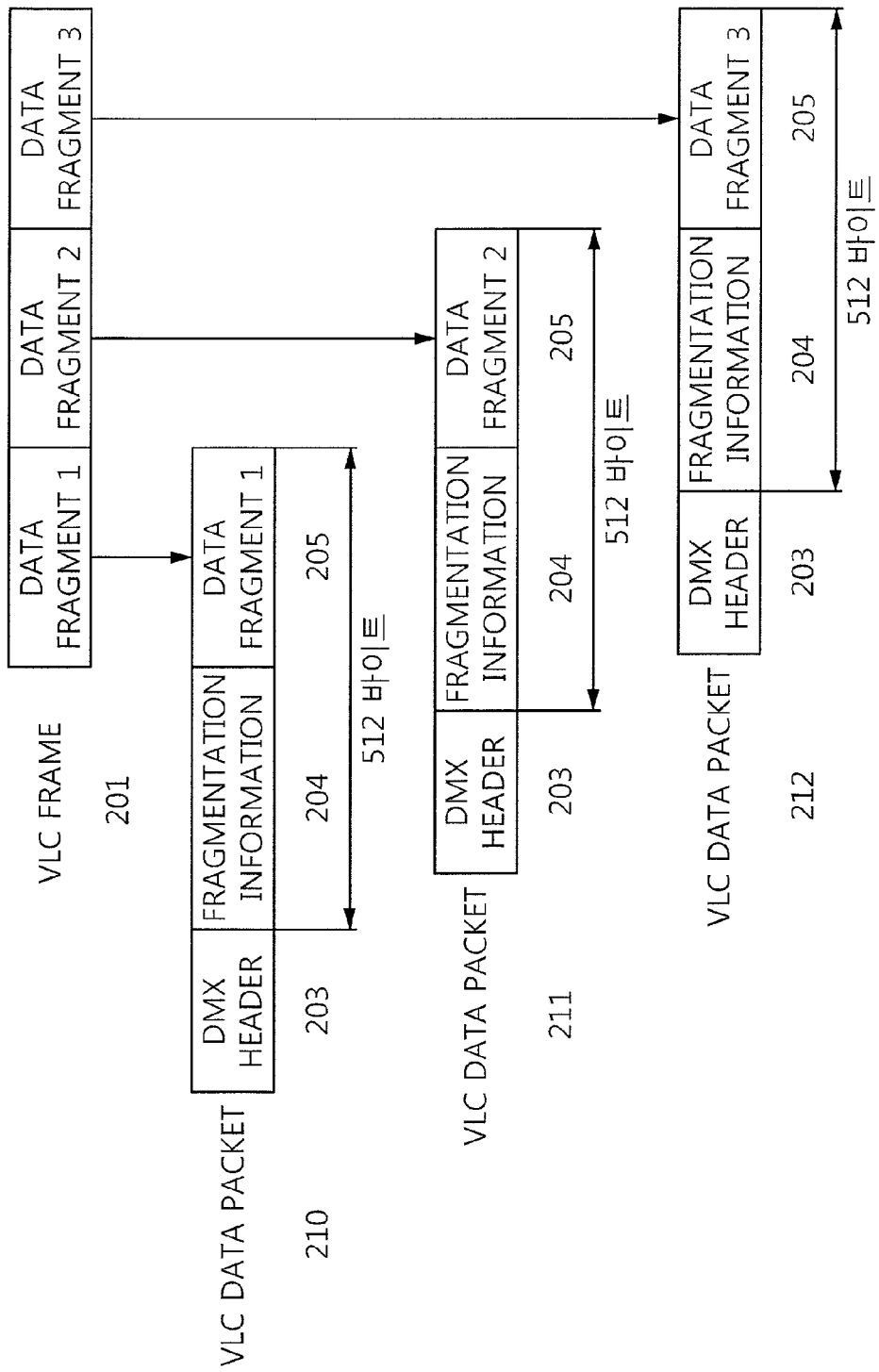
FIG. 2 is a diagram illustrating a process of generating VLC data packets from a VLC frame (i.e., communication data)

FIG. 2 is a diagram illustrating a process of generating VLC data packets from a VLC frame (i.e., communication data).

From FIG. 2, it can be seen that communication data (i.e., the VLC frame) 201 of 512 bytes or more cannot be transmitted at once over a DMX-512 network because of the limits of the DMX-512 standard, but the communication data is fragmented into a plurality of data fragments and then transmitted. That is, according to the present invention, the VLC frame 201 is fragmented into fragments of 512 bytes or less, and the fragments are separately packetized and transmitted.

VLC data packets 210, 211, and 212 shown in FIG. 2 are DMX-512 packets that are carried over a DMX-512 network. A DMX header 203 including a Break&Mark After Break (Break&MAB) and a Start Code (SC) is placed in the front of each of the DMX-512 packets.

Fragmentation information 204 that is placed behind the DMX header 203 indicates the number of data fragments that remain after a current data fragment 205 in order to complete the VLC frame 201 (i.e., the communication data). For example, the remainder information of the fragmentation information 204 of the VLC data 210 may be set to 2 in order to indicate that two data fragments remain. The remainder information of the fragmentation information 204 of the VLC data 211 may be set to 1 in order to indicate that one data fragment remains. The remainder information of the fragmentation information 204 of the VLC data 212 may be set to 0 in order to indicate that no data fragment remains.

When fragmentation information is inserted into a DMX-512 packet as described above, a DMX-VLC lighting apparatus which receives the DMX-512 packet can be aware of the number of data fragments that should be received in order to restore the original VLC frame 201 (i.e., communication data) and can perform corresponding processing. If the size of a VLC frame itself does not exceed 512 bytes, the VLC frame can be transmitted at once, with the remainder information of the fragmentation information thereof being set to 0.

Here, in relation to the first of data fragments, remainder information is set to a number that is obtained by subtracting 1 from the total number of data fragments corresponding to a single VLC frame, and, in relation to the remaining data fragments, remainder information may be set in the manner in which it sequentially decreases up to 0.

Furthermore, the fragmentation information may include a start flag that is set only for the first of the data fragments corresponding to the single VLC frame. Moreover, the fragmentation information may include number information corresponding to the serial numbers of the data fragments.

Figure 3:
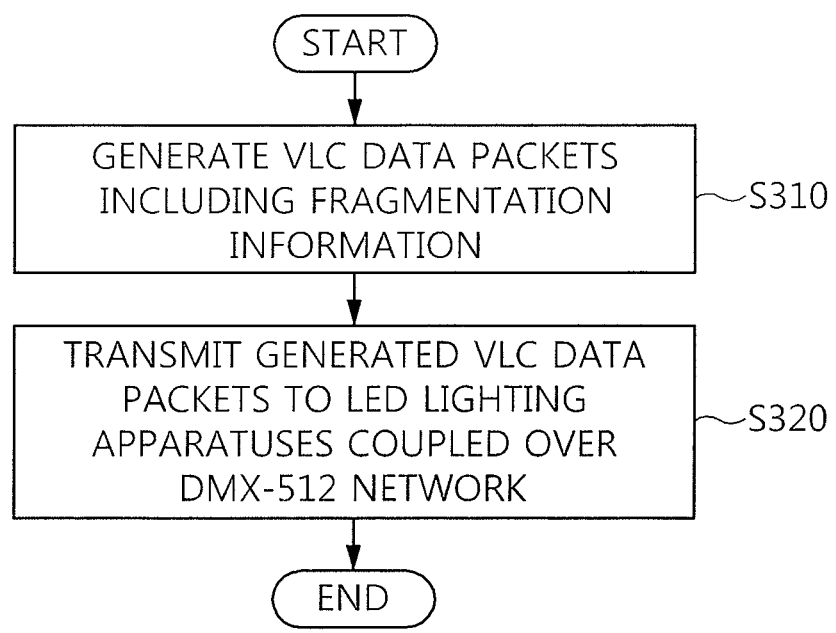
FIG. 3 is a flowchart illustrating a VLC method according to an embodiment of the present invention.

FIG. 3 is a flowchart illustrating a VLC method according to an embodiment of the present invention.

Referring to FIG. 3, in the VLC method according to this embodiment of the present invention, first, VLC data packets, each including a DMX header, fragmentation information, and a data fragment, are generated at step S310.

Here, the data fragment is generated by fragmenting a VLC frame, and the fragmentation information may be information that is used by a receiver to generate the VLC frame by recombining data fragments corresponding to the VLC data packets.

Here, the fragmentation information may include remainder information indicative of the number of data fragments that belong to data fragments corresponding to the VLC frame and remain after the data fragment.

Here, the remainder information is set to a number obtained by subtracting 1 from the total number of data fragments corresponding to the VLC frame in relation to the first of all the data fragments, and may be set in the manner in which it sequentially decreases up to 0 in relation to the remaining data fragments.

Here, the fragmentation information may include a start flag that is set only for the first of the data fragments. Accordingly, a receiver which performs VLC can identify the first data fragment that forms part of the VLC frame using the start flag.

Here, the fragmentation information may include number information corresponding to the serial numbers of the data fragments. Here, the total number of pieces of remainder information of data fragments that form a single VLC frame and the total number of pieces of number information of the data fragments that form the VLC frame may be the same.

Here, a DMX header includes Break&MAB information and a start code, and the start code may be set to a value that is different from a value used in a packet for lighting control.

Thereafter, the generated VLC data packets are transmitted to LED lighting apparatuses coupled over DMX-512 network at step S320.

Figure 4:
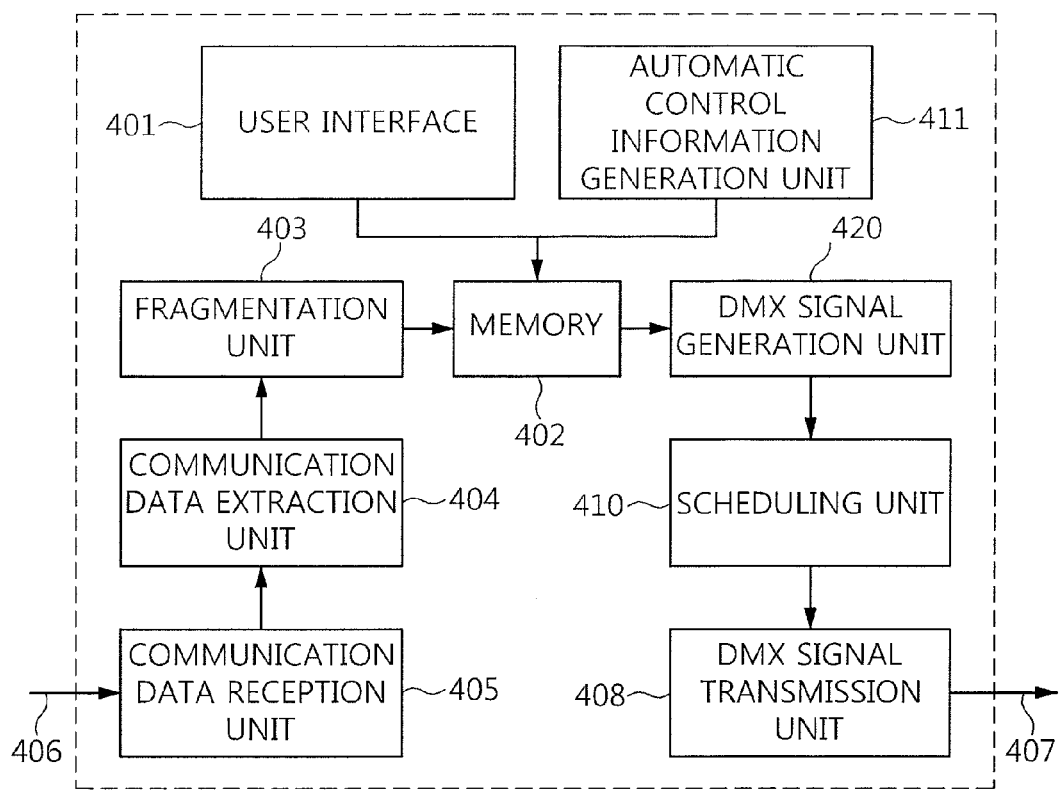
FIG. 4 is a block diagram illustrating a VLC apparatus according to an embodiment of the present invention.

FIG. 4 is a block diagram illustrating a VLC apparatus according to an embodiment of the present invention.

Referring to FIG. 4, the VLC apparatus according to this embodiment of the present invention includes a user interface 401, an automatic control information generation unit 411, memory 402, a fragmentation unit 403, a communication data extraction unit 404, a communication data reception unit 405, a DMX signal generation unit 420, a scheduling unit 410, and a DMX signal transmission unit 408.

In particular, the VLC apparatus of FIG. 4 may correspond to the lighting control apparatus of FIG. 1.

The basic operation of the VLC apparatus is to store dimming information, generated based on the input of a lighting operator received via the user interface 401 or generated by the automatic control information generation unit 411, in the memory 302.

The DMX signal generation unit 420 forms the dimming information, stored in the memory 402, into a DMX-512 packet, and transfers the DMX-512 packet to the scheduling unit 410.

In particular, the DMX signal generation unit 420 inserts 0 into the start code of a DMX header if the DMX-512 packet relates to dimming information.

If data for VLC is received via the communication data reception unit 405 through a line 406 connected to an external communication network, the communication data extraction unit 404 generates communication data (i.e., a VLC frame) using the received data. The fragmentation unit 403 fragments the generated communication data into data fragments each having a size of 512 bytes or less, and the data fragments and the fragmentation information thereof are stored in the memory 402.

The DMX signal generation unit 420 sequentially reads the data fragments from the memory 402, generates a DMX-512 packet by attaching a header and fragmentation information for enabling passage through a DMX-512 line 407 to each of the read data fragments, and transmits the DMX-512 packet to the scheduling unit 410. If the generated DMX-512 packet is intended for VLC, the DMX signal generation unit 420 sets the start code of a DMX header to a value that is different from 0.

That is, the DMX signal generation unit 420 generates DMX-512 packets using information, stored in the memory 402, at specific intervals under the control of the scheduling unit 410, and transfers the generated DMX-512 packets to the DMX signal transmission unit 408. Here, the scheduling unit 410 may schedule dimming data by extending the transmission interval of the dimming data within the limits of the DMX-512 standard so that VLC data can be transmitted between pieces of dimming data.

The DMX signal transmission unit 408 transmits the DMX-512 packets to the DMX-VLC lighting apparatuses over the DMX-512 line 407.

In some embodiments, the DMX signal generation unit 420 may transmit the DMX-512 packets directly to the DMX signal transmission unit 408 without intervention of the scheduling unit 410. In this case, the scheduling unit 410 may appropriately schedule the generation of the DMX-512 packet of the DMX signal generation unit 420 using dimming data or VLC data.

Figure 5:
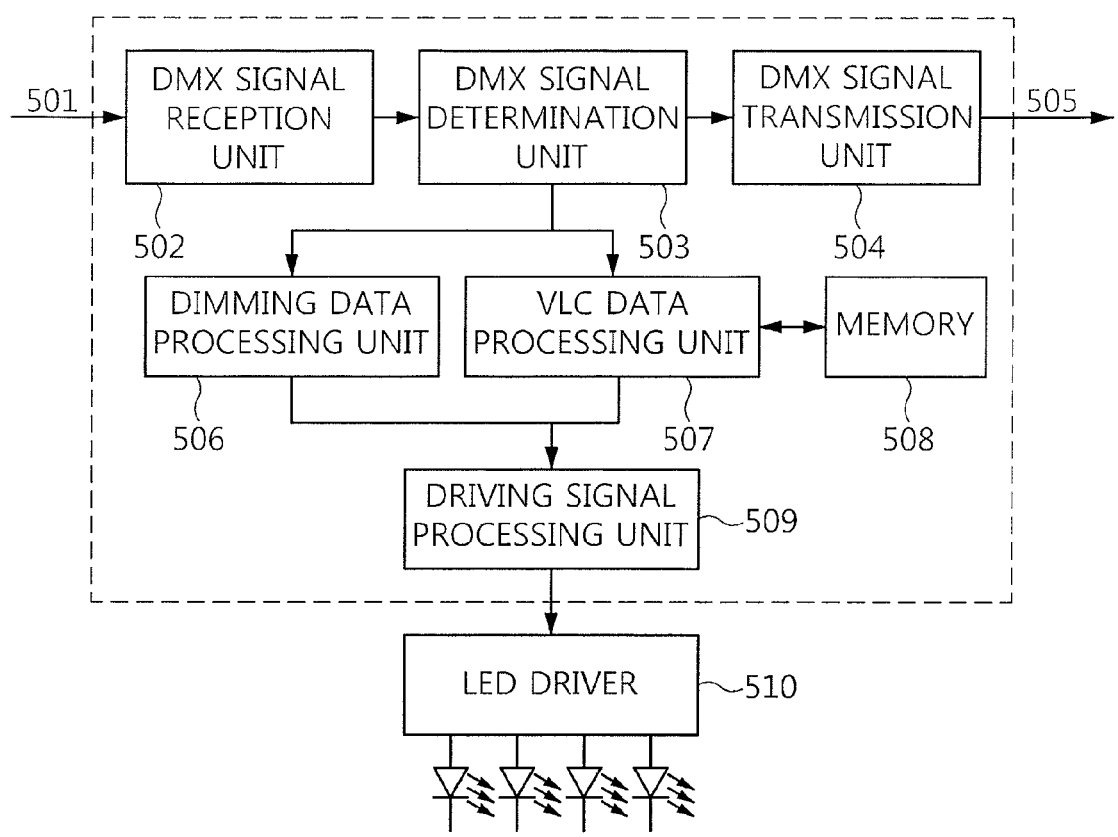
FIG. 5 is a block diagram illustrating a VLC lighting apparatus according to an embodiment of the present invention.

FIG. 5 is a block diagram illustrating a VLC lighting apparatus according to an embodiment of the present invention.

Referring to FIG. 5, the VLC lighting apparatus according to this embodiment of the present invention includes a DMX signal reception unit 502, a DMX signal determination unit 503, a DMX signal transmission unit 504, a dimming data processing unit 506, a VLC data processing unit 507, memory 508, a driving signal processing unit 509, and an LED driver 510.

In particular, the VLC lighting apparatus of FIG. 5 may correspond to the DMX-VLC lighting apparatus of FIG. 1.

The DMX signal reception unit 502 receives DMX-512 packets through a DMX line 501, and transmits the DMX-512 packets to the DMX signal determination unit 503. The DMX signal determination unit 503 first transmits DMX-512 packets, received for other DMX-VLC lighting apparatuses on a network, to a DMX line 505 through the DMX signal transmission unit 504.

When the start code of each of the received DMX-512 packets is 0, the DMX signal determination unit 503 transmits control information to the DMX dimming data processing unit 506 so that lighting is turned on through the driving signal processing unit 509 and the LED driver 510.

When the start code of DMX control information has a value set for VLC other than 0, the DMX signal determination unit 503 transmits the data of the received DMX-512 packet to the VLC data processing unit 507 so that VLC is performed. The VLC data processing unit 507 accumulates data in the memory 508 until it receives data including a DMX-512 packet having fragmentation information 0. When a DMX-512 packet having fragmentation information 0 is received, the VLC data processing unit 407 loads data from the memory 508, generates a complete VLC frame using the loaded data, and transmits VLC frame data, generated through VLC, via the driving signal processing unit 509 and the LED driver 510.

Figure 6:
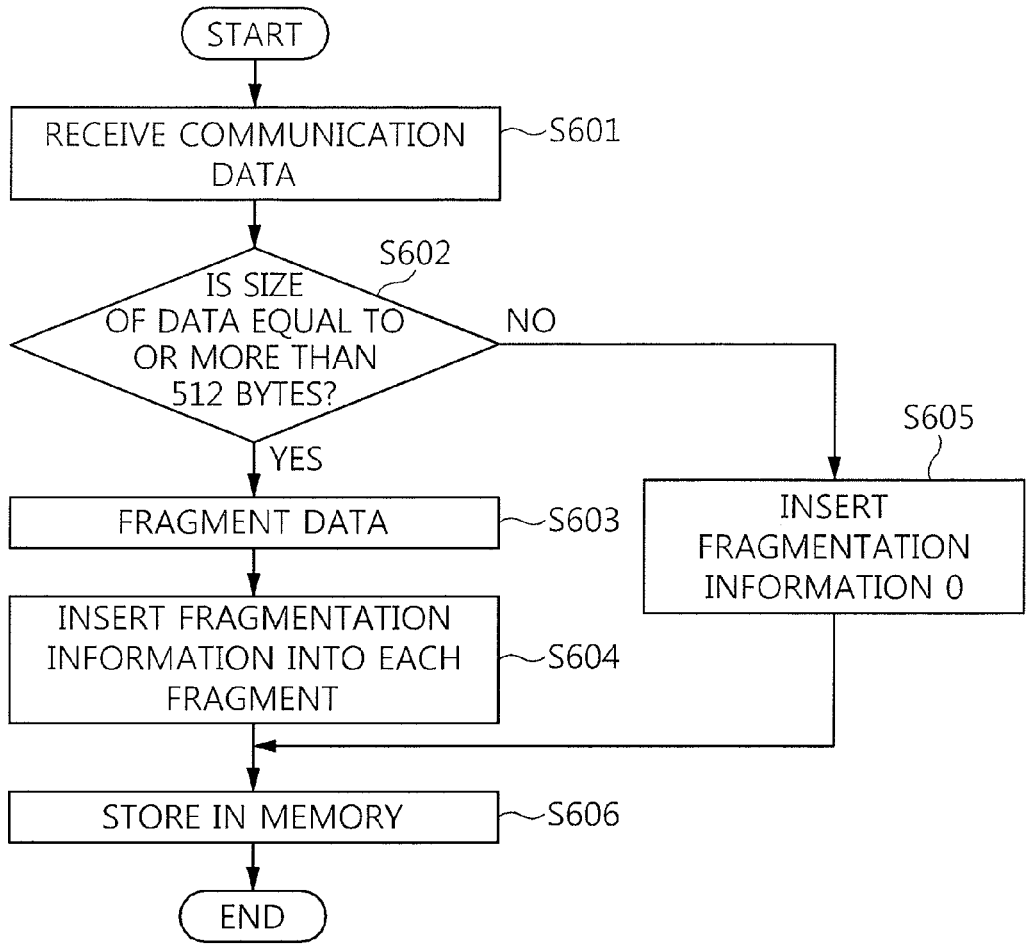
FIG. 6 is a flowchart illustrating a process of the VLC apparatus of FIG. 4 processing a VLC frame.

FIG. 6 is a flowchart illustrating a process of the VLC apparatus of FIG. 4 processing a VLC frame.

Referring to FIG. 6, the communication data reception unit 405 receives communication data to be used in VLC at step S601.

The fragmentation unit 403 determines whether the length of the received communication data is 512 bytes or more at step S602. If, as a result of the determination at step S602, the length of the received communication data is determined to be less than 512 bytes, the fragmentation unit 403 attaches fragmentation information 0 in the front of the communication data at step S605, and stores the communication data and the fragmentation information in the memory 402 at step S606.

If, as a result of the determination at step S602, the length of the received communication data is determined to be 512 bytes or more, the fragmentation unit 403 fragments the communication data into data fragments each having bytes less than 512 bytes at step S603.

The fragmentation unit 403 inserts fragmentation information into each of the data fragments at step S604. Here, the fragmentation information may include remainder information indicative of the number of remaining data fragments. For example, pieces of fragmentation information 0, 1, 2, . . . may be sequentially attached to the data fragments from the last fragment to the first fragment.

The data fragments to which the fragmentation information has been attached may be sequentially stored in the memory 402 in descending order of size of remainder information included in fragmentation information at step S606. Here, DMX-512 packets may be generated and transmitted in order of storage of the data fragments in the memory 402.

Figure 7:
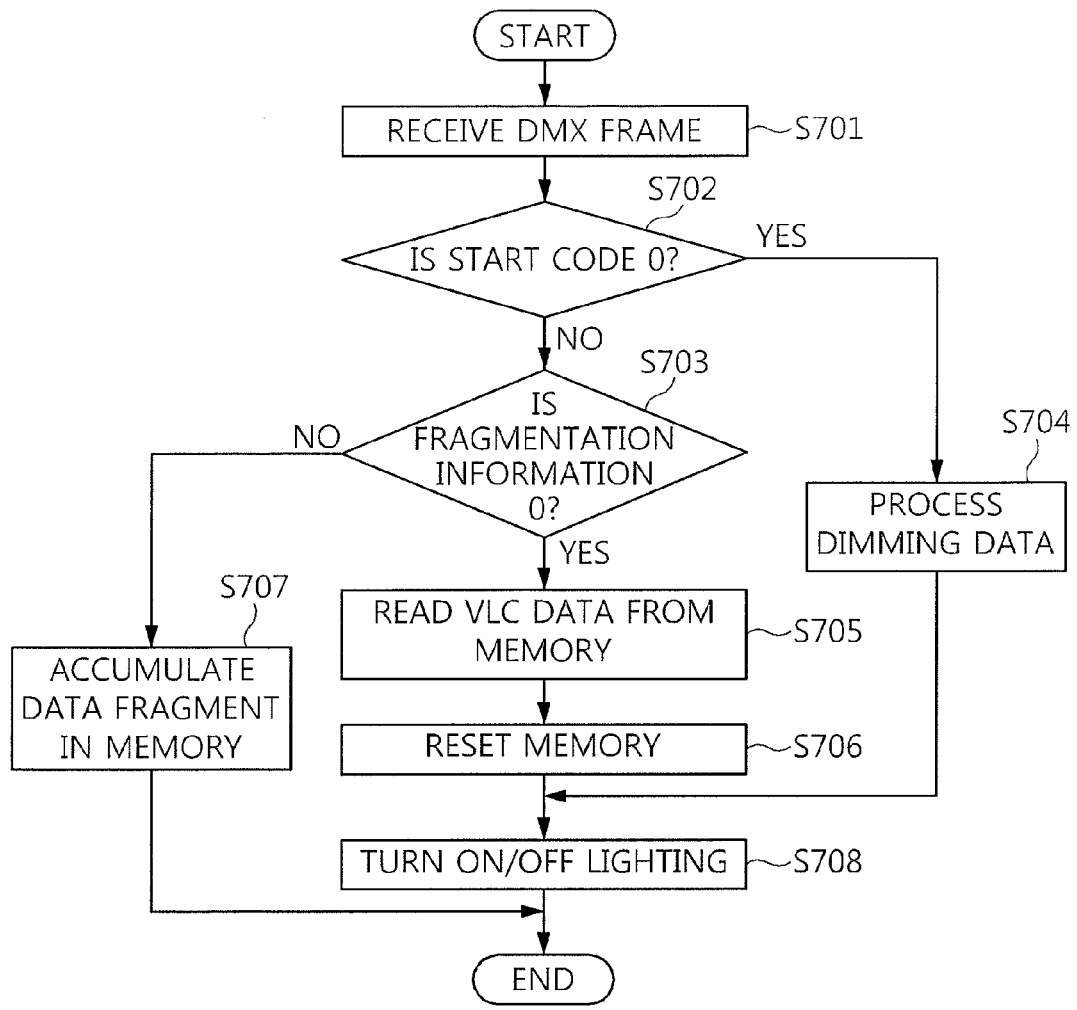
FIG. 7 is a flowchart illustrating a processing process when the VLC lighting apparatus of FIG. 5 receives a DMX-512 packet.

FIG. 7 is a flowchart illustrating a processing process when the VLC lighting apparatus of FIG. 5 receives a DMX-512 packet.

Referring to FIG. 7, the DMX-VLC lighting apparatus (i.e., a VLC lighting apparatus) receives a DMX-512 packet at step S701.

The DMX-VLC lighting apparatus determines whether the start code of the received DMX-512 packet is 0 at step S702.

If, as a result of the determination at step S702, the start code of the DMX-512 packet is determined to be 0, the DMX-VLC lighting apparatus turns on/off lighting via the common process S704 of processing a DMX-512 packet at step S708.

If, as a result of the determination at step S702, the start code of the DMX-512 packet is determined to be a value set for VLC other than 0, the DMX-VLC lighting apparatus determines whether the remainder information of the fragmentation information of the DMX-512 packet is 0 at step S703.

If, as a result of the determination at step S703, the remainder information of the fragmentation information of the DMX-512 packet is determined not to be 0, the DMX-VLC lighting apparatus accumulates data fragments in the memory 508 at step S707, and then terminates the process. If, as a result of the determination at step S703, the remainder information of the fragmentation information of the DMX-512 packet is determined to be 0, the DMX-VLC lighting apparatus reads data from the memory 508 at step S705, attaches the data of the DMX-512 packet to the read data, resets the memory 508 at step S706, and turns on/off lighting using VLC technology related to the corresponding VLC data at step S708.

The resetting of the memory 508 at step S706 is performed in order to prevent errors attributable to VLC data that will be subsequently received.

The above-described VLC method and apparatus using a DMX-512 network according to the present invention are not limited to the configurations and methods of the above-described embodiments, and some or all of the embodiments may be selectively combined such that the embodiments can be modified in a variety of manners.

According to the present invention, VLC data to be transmitted through VLC over a DMX-512 lighting control network can be effectively transferred to a light source.

Furthermore, according to the present invention, even when VLC data to be transmitted through VLC exceeds 512 bytes, the VLC data can be transmitted to LED lighting apparatuses that are coupled over a DMX-512 lighting control network.

Furthermore, according to the present invention, VLC data can be appropriately fragmented such that the VLC data can be transmitted over a DMX-512 lighting control network, and appropriate fragmentation information can be inserted into each data fragment so that a receiving side can restore the fragmented data precisely and effectively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Visible Light Communication (VLC) method, comprising:
    generating VLC data packets each comprising a DMX header, fragmentation information, and a data fragment; and
    transmitting the VLC data packets to a Light-Emitting Diode (LED) lighting apparatus coupled over a DMX-512 network in order to perform VLC.

2. The VLC method of claim 1, wherein:
    the data fragment is generated by fragmenting a VLC frame to be transmitted; and
    the fragmentation information is used by a receiver to generate the VLC frame by recombining data fragments corresponding to the VLC data packets.

3. The VLC method of claim 2, wherein other data is not transmitted until all the data fragments that are generated by fragmenting the VLC frame are transmitted.

4. The VLC method of claim 3, wherein the fragmentation information comprises remainder information indicative of a number of data fragments that belong to the data fragments corresponding to the VLC frame and remain after the data fragment.

5. The VLC method of claim 4, wherein the remainder information is set to a number that is obtained by subtracting 1 from a number of all data fragments in relation to a first data fragment of the data fragments, and is set in a manner of sequentially decreasing up to 0 in relation to remaining data fragments.

6. The VLC method of claim 5, wherein the fragmentation information comprises a start flag that is set only for a first one of the data fragments.

7. The VLC method of claim 6, wherein the fragmentation information comprises number information that corresponds to serial numbers of the data fragments.

8. The VLC method of claim 7, wherein:
    the DMX header comprises Break&Mark After Break (Break&MAB) information and a start code; and
    the start code is set to a value that is different from a value used in a packet intended for lighting control.

9. A VLC apparatus, comprising:
    a DMX signal generation unit configured to generate VLC data packets each comprising a DMX header, fragmentation information, and a data fragment; and
    a DMX signal transmission unit configured to transmit the VLC data packets to an LED lighting apparatus coupled over a DMX-512 network in order to perform VLC.

10. The VLC apparatus of claim 9, wherein:
    the data fragment is generated by fragmenting a VLC frame to be transmitted; and
    the fragmentation information is used by a receiver to generate the VLC frame by recombining data fragments corresponding to the VLC data packets.

11. The VLC apparatus of claim 10, wherein the VLC apparatus does not transmit other data until all the data fragments generated by fragmenting the VLC frame are transmitted.

12. The VLC apparatus of claim 11, wherein the fragmentation information comprises remainder information indicative of a number of data fragments that belong to the data fragments corresponding to the VLC frame and remain after the specific data fragment.

13. The VLC apparatus of claim 12, wherein the remainder information is set to a number that is obtained by subtracting 1 from a number of all data fragments in relation to a first one of the data fragments, and is set in a manner of sequentially decreasing up to 0 in relation to remaining data fragments.

14. The VLC apparatus of claim 13, wherein the fragmentation information comprises a start flag that is set only for the first one of the data fragments.

15. The VLC apparatus of claim 14, wherein the fragmentation information comprises number information that corresponds to serial numbers of the data fragments.

16. The VLC apparatus of claim 15, wherein:

the DMX header comprises Break&MAB information and a start code; and the start code is set to a value that is different from a value used in a packet intended for lighting control.

17. A DMX-VLC lighting apparatus, comprising:

a DMX signal reception unit configured to receive VLC data packets each comprising a DMX header, fragmentation information, and a data fragment; and a VLC data processing unit configured to generate a VLC frame by recombining data fragments corresponding to the VLC data packets using the fragmentation information.

18. The DMX-VLC lighting apparatus of claim 17, wherein the fragmentation information comprises remainder information indicative of a number of data fragments that belong to the data fragments corresponding to the VLC frame and remain after the data fragment.

19. The DMX-VLC lighting apparatus of claim 18, wherein the remainder information is set to a number that is obtained by subtracting 1 from a number of all data fragments in relation to a first data fragment of the data fragments, and is set in a manner of sequentially decreasing up to 0 in relation to remaining data fragments.

20. The DMX-VLC lighting apparatus of claim 19, wherein the fragmentation information comprises a start flag that is set only for a first one of the data fragments.

* * * * *